United States Patent Office 3,681,048
Patented Aug. 1, 1972

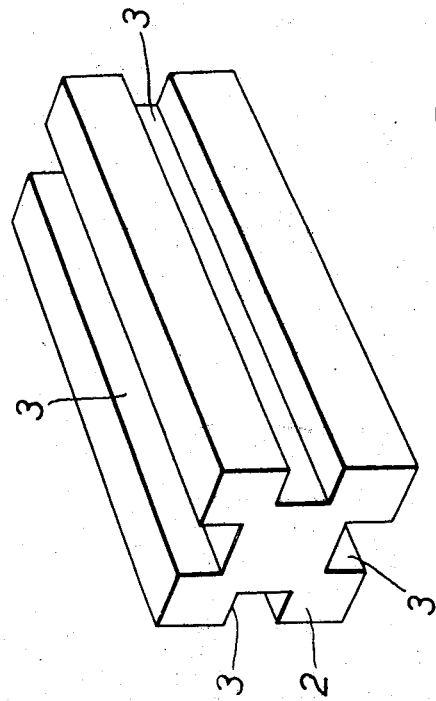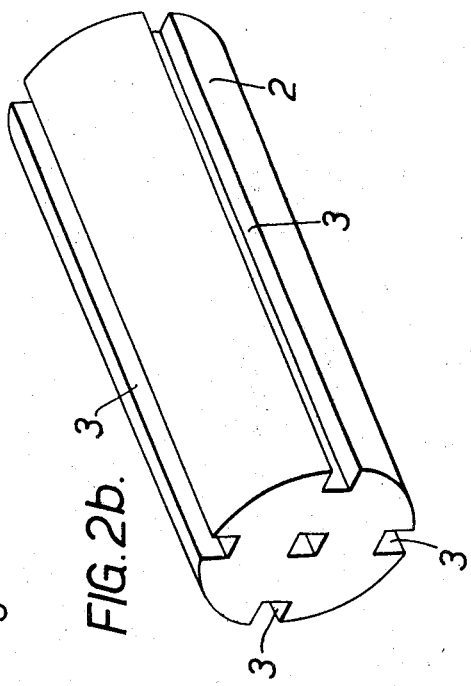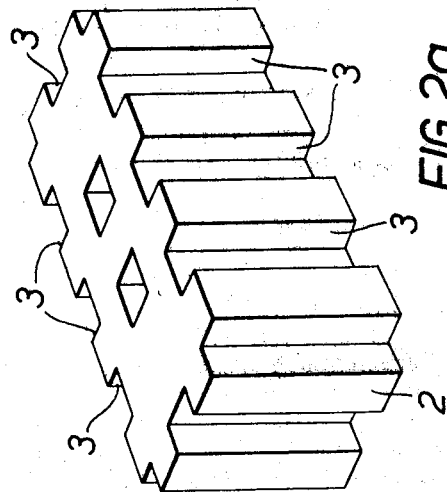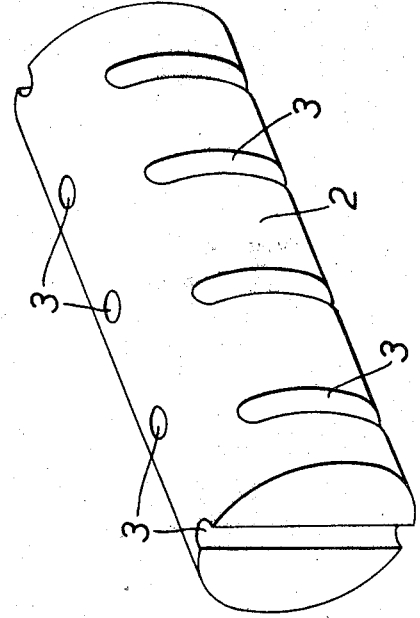

3,681,048
STEELMAKING PROCESS USING IRON SCRAP BUNDLES
Akemasa Otani, 4, 2-chome, Asakusa Hashiba-cho, Taito-ku, Tokyo, Japan
Continuation-in-part of application Ser. No. 581,288, Sept. 22, 1966. This application June 19, 1967, Ser. No. 646,915
Claims priority, application Japan, June 27, 1966, 41/41,422
Int. Cl. C21b 1/08, 1/30
U.S. Cl. 75—44 S
5 Claims

ABSTRACT OF THE DISCLOSURE

An improved steelmaking process using iron scrap bundles comprising, forming the bundles with grooves, depressions, or holes, charging the bundles into a steelmaking furnace, and melting the bundles.

This application is a continuation-in-part of my copending application Ser. No. 581,288, filed Sept. 22, 1966.

BACKGROUND OF THE INVENTION

This invention relates to the steelmaking art and more particularly to methods of making steel from iron scrap bundles. Conventional iron scrap bundles for steel making have been formed by compacting or press molding a plurality of iron scraps. When these bundles are charged into a steelmaking furnace along with pig iron and the like and melted, the conduction of heat is reduced resulting in the consequent reduction of steelmaking efficiency. The present invention has as an object the improvement of this steelmaking process by using bundles of scrap iron which have depressions, grooves, or holes formed in the external surfaces and/or in the interior of the bundles.

SUMMARY OF THE INVENTION

According to the invention, bundles are formed having grooves or holes, and these bundles are charged into the steelmaking furnace and melted by means of electrical or gas-flame heating. In the process the various refining operations, such as the decarbonization, deoxidation, and others are carried out in the conventional manner. The depressions or holes in the iron scrap bundles increase the area of heat transfer so that the bundles can be rapidly melted, and the efficiency of the steelmaking process is greatly increased.

These and other features and advantages of the present invention will become apparent from a consideration of the following description and the accompanying drawings illustrating iron scrap bundles used in the steelmaking process of this invention.

BRIEF DESCRIPTION OF THE DRAWINGS

FIGS. 1a and 1b are perspective views showing generally rectangular-shaped iron scrap bundles; and FIGS. 2a and 2b are perspective views of cylindrically-shaped iron scrap bundles.

DESCRIPTION OF THE PREFERRED EMBODIMENT

Although the invention will be described in connection with the use of iron scrap bundles made from discarded automobiles, bundles made from other iron scrap materials can be similarly used.

Referring to the drawings, discarded automobiles are initially charged into a heating furnace and heated to a temperature of about 400° C. to 1000° C. to thereby melt and remove nonferrous materials such as glass, lead, aluminum, copper, etc. The resulting scraps of pure iron are then transferred into a compacting or press molding apparatus and strongly compacted to form a pure iron scrap bundle 2. During the compacting operation, a deoxidizer, desulfurizer, reducing agent, or other refining agent such as silicone, quicklime, coke, iron scale, manganese ore, fluorite, carbide, slaked lime packed in vinyl bags, etc., not shown, is uniformly incorporated into the scraps and the mixture is integrally compacted to form the iron scrap bundles 2. Further, during this compacting operation, the corners and elges of the bundles 2 may be made rounded; and holes and/or grooves 3 are formed in the bundles, as shown in the drawings, in a hydraulic cylinder press or the like.

When manufacturing iron from such iron scrap bundles, they are charged into a steelmaking furnace, such as an open-hearth furnace, an electric furnace or the like, and the bundles are heated and melted. Since the bundles are formed with grooves and/or holes in the exterior and/or the interior thereof so as to increase the area of heat transfer for melting, the bundles can be quickly and efficiently heated in the furnace and are, thus, readily melted even though they have been tightly compacted.

Further, with such tightly compacted bundles, there is no risk of their being crumbled or fractured when they are being conveyed or thrown into the furnace. Moreover, the rounded corners and edges of the bundles prevent the interior equipment of the furnace such as structural bricks from being broken, thus insuring safe operation.

It will be obvious to those skilled in the art that many changes and modifications may be made from the above description without departing from the spirit and scope of the invention, and accordingly, the invention is not to be limited except by the following claims.

What is claimed is:

1. A process of making steel using iron scraps, comprising: aggregating scraps of pure iron, pressing said iron scraps into a compact bundle, forming a plurality of substantially parallel, spaced hollows therein, having a length or depth at least approaching that of said bundle for increasing the surface area of the bundle and thereby promoting heating and melting of said bundle, charging said bundle into a steelmaking furnace and heating and melting said bundle in said furnace.

2. The process of claim 1 wherein the hollows are exterior grooves.

3. The process of claim 1 wherein the hollows are exterior grooves and at least one interior opening.

4. The process of claim 1 wherein the hollows are interior openings.

5. The process of claim 1 wherein the process includes the step of incorporating refining agents into the bundle.

References Cited

UNITED STATES PATENTS

| | | | |
|---|---|---|---|
| 140,383 | 7/1873 | Pevey | 75—44 |
| 316,209 | 4/1885 | Westerman | 75—44 |
| 3,323,447 | 6/1967 | Tezuka | 100—238 |
| 3,371,599 | 3/1968 | Tezuka | 100—232 |

L. DEWAYNE RUTLEDGE, Primary Examiner

J. E. LEGRU, Assistant Examiner

U.S. Cl. X.R.

29—186; 75—10